US009080305B2

(12) United States Patent
Vandenbulcke et al.

(10) Patent No.: US 9,080,305 B2
(45) Date of Patent: Jul. 14, 2015

(54) METHOD OF PROVIDING A FOUNDATION FOR AN ELEVATED MASS, AND ASSEMBLY OF A JACK-UP PLATFORM AND A FRAMED TEMPLATE FOR CARRYING OUT THE METHOD

(75) Inventors: Luc Vandenbulcke, Kontich (BE); Koen Vanderbeke, Erps-Kwerps (BE)

(73) Assignee: Geosea N.V., Zwijndrecht (BE)

( * ) Notice: Subject to any disclaimer, the term of this patent is extended or adjusted under 35 U.S.C. 154(b) by 96 days.

(21) Appl. No.: 13/006,236

(22) Filed: Jan. 13, 2011

(65) Prior Publication Data
US 2011/0170956 A1 Jul. 14, 2011

(30) Foreign Application Priority Data

Jan. 13, 2010 (EP) ..................................... 10150606

(51) Int. Cl.
| | | |
|---|---|---|
| *E02D 5/00* | (2006.01) | |
| *E02D 27/42* | (2006.01) | |
| *E02D 27/50* | (2006.01) | |
| *E02D 27/52* | (2006.01) | |
| *F03D 11/04* | (2006.01) | |
| *E02B 17/00* | (2006.01) | |

(52) U.S. Cl.
CPC ................ *E02D 27/42* (2013.01); *E02D 27/50* (2013.01); *E02D 27/52* (2013.01); *F03D 11/045* (2013.01); *E02B 2017/0091* (2013.01); *F05B 2240/95* (2013.01); *Y02E 10/727* (2013.01)

(58) Field of Classification Search
CPC ....... E02B 17/021; E02B 17/00; E02B 17/02; E02B 2017/0039; E02B 2017/0091

USPC .......... 405/224, 227, 228, 232; 166/352, 354, 166/358; 175/5, 7, 9, 220
See application file for complete search history.

(56) References Cited

U.S. PATENT DOCUMENTS

| | | | | |
|---|---|---|---|---|
| 2,651,181 A | * | 9/1953 | Alcorn et al. | 405/204 |
| 3,572,044 A | * | 3/1971 | Pogonowski | 405/204 |
| 3,948,056 A | | 4/1976 | Sumner | |
| 4,051,685 A | * | 10/1977 | Jansz | 405/228 |
| 4,227,831 A | * | 10/1980 | Evans | 405/196 |
| 4,408,932 A | * | 10/1983 | Cowan | 405/227 |
| 4,739,840 A | | 4/1988 | Cox | |
| 4,740,107 A | * | 4/1988 | Casbarian et al. | 405/211 |

(Continued)

FOREIGN PATENT DOCUMENTS

| | | |
|---|---|---|
| EP | 2 067 915 | 6/2009 |
| WO | WO 2009139616 A2 * | 11/2009 |

*Primary Examiner* — Doug Hutton, Jr.
*Assistant Examiner* — Patrick Lambe
(74) *Attorney, Agent, or Firm* — Novak Druce Connolly Bove + Quigg LLP

(57) ABSTRACT

The application relates to an efficient method of providing a foundation for an elevated mass, such as the jacket of a wind mill, the foundation consists of a plurality of piles, driven into a substrate according to a geometric pattern. The method an assembly of a jack-up platform and a framed template, the template having a plurality of interconnected sleeve guide members for receiving the piles, arranged according to the geometric pattern, and means for slidably moving it along the spud poles of the platform. The framed template is lowered along the spud poles from an in-operative position close to the deck of the platform towards the substrate, and piles driven into the substrate through the sleeve guide members of the template. The invention also relates to a framed template and to an assembly of a jack-up platform and a framed template, adapted for carrying out the method.

16 Claims, 10 Drawing Sheets

(56) References Cited

U.S. PATENT DOCUMENTS

Figure 1:
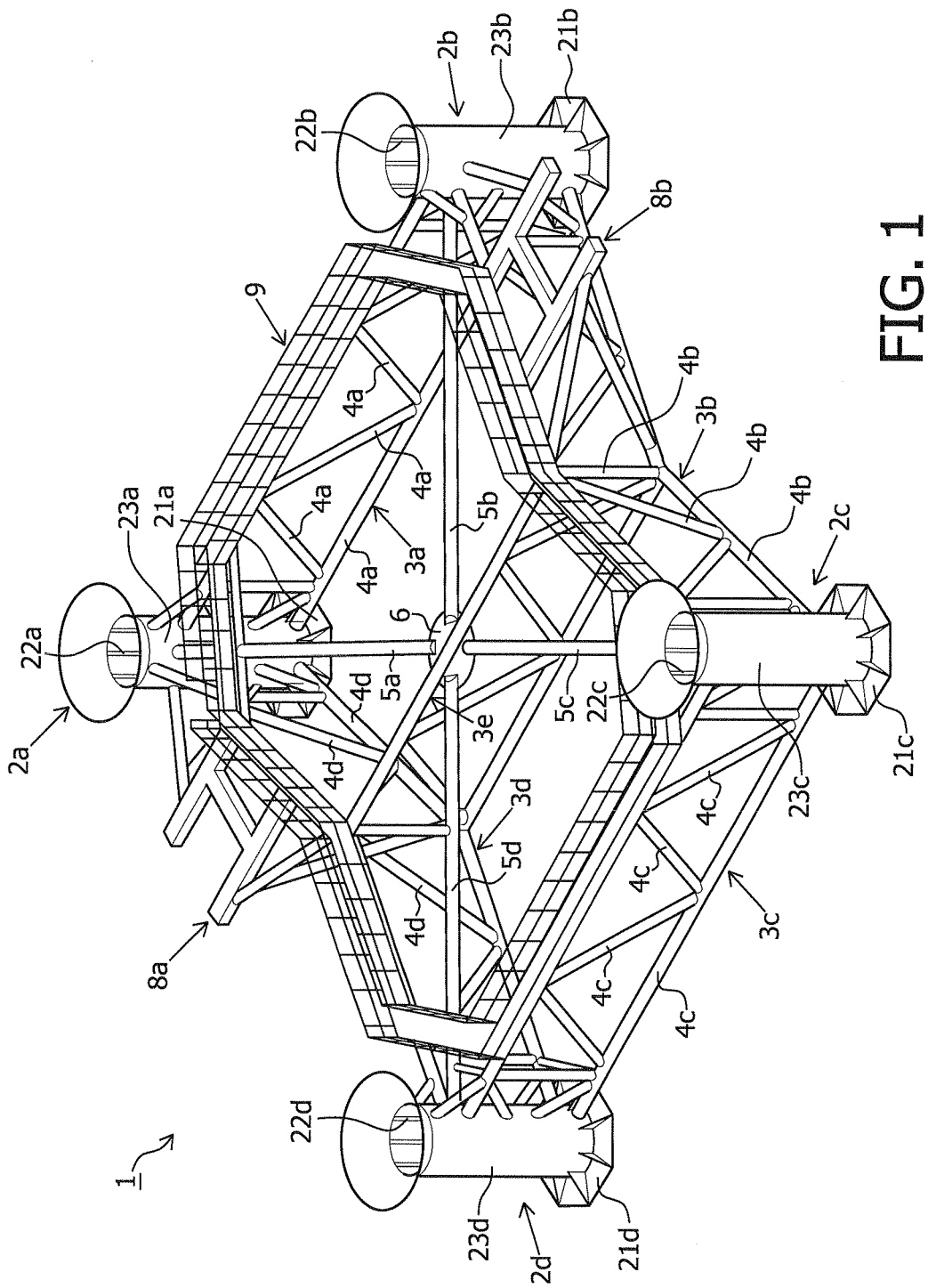

| | | | |
|---|---|---|---|
| 4,797,035 A * | 1/1989 | Hunter | 405/205 |
| 4,907,657 A * | 3/1990 | Cox | 175/9 |
| 4,907,912 A * | 3/1990 | Smith | 405/208 |
| 5,012,875 A * | 5/1991 | Casbarian et al. | 175/9 |
| 5,244,312 A * | 9/1993 | Wybro et al. | 405/204 |
| 5,379,844 A * | 1/1995 | Glasscock et al. | 166/358 |
| 5,593,250 A * | 1/1997 | Smith et al. | 405/205 |
| 5,702,206 A * | 12/1997 | Quenan et al. | 405/227 |
| 5,722,494 A * | 3/1998 | Landeck et al. | 175/7 |
| 6,036,404 A * | 3/2000 | De Medeiros et al. | 405/223.1 |
| 6,142,709 A * | 11/2000 | De Medeiros et al. | 405/224 |
| 6,299,385 B1 * | 10/2001 | Barnes | 405/227 |
| 6,312,195 B1 * | 11/2001 | De Medeiros et al. | 405/224 |
| 6,318,933 B1 * | 11/2001 | De Medeiros et al. | 405/223.1 |
| 6,354,767 B1 | 3/2002 | Jones | |
| 6,568,880 B2 * | 5/2003 | De Medeiros et al. | 405/224 |
| 7,850,398 B2 * | 12/2010 | Foo et al. | 405/212 |
| 7,854,570 B2 * | 12/2010 | Heidari | 405/223.1 |
| 8,403,058 B2 * | 3/2013 | Nadarajah et al. | 166/365 |
| 2004/0115006 A1 * | 6/2004 | Facey et al. | 405/203 |
| 2005/0117976 A1 | 6/2005 | Jones | |
| 2006/0051164 A1 * | 3/2006 | Foo et al. | 405/228 |
| 2008/0199259 A1 * | 8/2008 | Cannon | 405/232 |
| 2009/0129870 A1 | 5/2009 | Jones | |

* cited by examiner

METHOD OF PROVIDING A FOUNDATION FOR AN ELEVATED MASS, AND ASSEMBLY OF A JACK-UP PLATFORM AND A FRAMED TEMPLATE FOR CARRYING OUT THE METHOD

CROSS-REFERENCE TO RELATED APPLICATIONS

This application claims priority to European Patent Application 10150606.1, filed Jan. 13, 2010, the entire contents of which are incorporated herein by reference.

The invention relates to a method of providing a foundation for an elevated mass, such as the jacket of a windmill or a jetty, whereby the foundation comprises a plurality of piles, driven into a substrate according to a geometric pattern. The invention also relates to an assembly of a jack-up platform and a framed template, adapted for carrying out the method.

FIELD OF THE INVENTION

The invention will be explained below with reference to an offshore windmill. The reference to a windmill does not imply any limitations of the scope and extent of the invention. The method may equally be applied to any other structure, such as jetties, radar and other towers, platforms, and the like. The supporting structure of a windmill usually has a slim design, for instance constituted by a pipe. This pipe structure has to be coupled to a foundation in the ground. For offshore windmills that are placed in relatively deep waters, it is possible to have one pipe projecting all the way down from the machinery housing of the windmill to the foundation thereof apart from such a 'monopile' construction, the supporting tower structure for an offshore windmill may also comprise a tubular upper portion and a lower portion in the form of a trussed structure, referred to as a jacket. A large part of the jacket extends under water where it takes support onto a substrate, which in many cases is the underwater bottom.

A known method of providing a foundation for an elevated mass, such as the jacket of a windmill, involves providing an off-shore platform in the vicinity of the envisaged location for the foundation, determining the location for each pile, manipulating each pile with the aid of a lifting crane provided on the platform, and driving each pile into the substrate. When all piles have been provided into the substrate according to the desired geometrical pattern, thereby forming the foundation, the jacket is installed onto the foundation formed by the plurality of piles by inserting legs of the jacket into the piles. The piles are adapted to receive the legs of the jacket, for instance by providing hollow piles.

The above manipulations of the known method are time-consuming, and, in a typical case, may take as long as 5 to 7 days to be completed.

BACKGROUND OF THE INVENTION

U.S. Pat. No. 6,299,385 describes the use of a mini jacket for pile installation in an ocean floor. The mini jacket comprises a structural frame with pile sleeves at the corners and a caisson sleeve located within the perimeter of the frame. The mini jacket may be lifted and lowered by sliding its caisson sleeve over a caisson in the form of a tubular pile that has been driven in the ocean floor. In pile installation, piles are driven through the pile sleeves of the mini jacket into the ocean floor.

It is an object of the present invention to provide a method and device of providing a foundation for an elevated mass that is more efficient than the known method, i.e. may require less time than the known method.

According to the invention, this object is achieved by a method comprising:
providing an assembly of a jack-up platform and a framed template, the template having a plurality of interconnected sleeve guide members for receiving the piles, arranged according to the geometric pattern, and means for slidably moving it along the spud poles of the platform,
lowering the framed template along the spud poles from an in-operative position close to the deck of the platform towards the substrate to an operative position; and
driving the piles into the substrate through the sleeve guide members of the template in its operative position.

The method according to the invention allows providing a foundation in the form of a plurality of piles arranged according to a geometric pattern in less time than known hitherto. After having positioned the jack-up platform in its correct position (in view of the envisaged position of the plurality of piles), it need not be repositioned, as is often required in the known method. Since the template is moved into its operative position by sliding it along the spud poles of the jack-up platform, the template is automatically positioned correctly when the platform is in its correct position. This is very advantageous since positioning a jack-up platform is easily performed by global positioning systems, whereas accurate positioning of structures under water is generally very difficult and expensive. Moreover, since the position of the template is determined by the position of the platform, and the latter is not appreciably influenced by currents and wind forces, this also applies to the template. Also, the use of the template allows to accurately position the plurality of piles in one operation. The operative position of the template corresponds to a position in which the template, and in particular the sleeve guide members thereof, is ready to receive the piles. The operative position preferably corresponds to a position close to the substrate, and even more preferably to a position in which the template substantially rests on the substrate.

Since the position of the template is determined by the position of the (jack-up) platform, and the latter position may be determined with great accuracy, there is no need to check the position of the piles of the foundation afterwards. This saves a significant amount of time and money.

The template may be moved along the spud poles by any means known in the art. It is for instance possible to carry the framed template with a plurality of tension cables attached to it, whereby the cables are varied in length by winches, provided on the platform, and in particular on the work deck thereof. With the aid of the winches, the cables are shortened and/or extended, thereby respectively lifting and/or lowering the template. In a preferred embodiment of the method according to the invention, the means for slidably moving the template along the spud poles of the platform are adapted to level the template such that it is substantially horizontal in its operative position. This may for instance be achieved by at least three; and preferably four cables, from which the template is suspended. More preferably, the winches control the cable lengths independently from each other. The cables are preferably operated by at least three, and preferably four winches. Being able to level the template is in particular useful when the substrate, for instance an underwater bottom, is not level itself but shows heights and valleys.

The framed template according to the invention preferably comprises a trussed structure with a plurality of spaced apart sleeve guide members, interconnected by tubular frame members. The template typically has planar dimensions that are larger than the out-of plane dimension, the latter corresponding to a direction parallel to the direction of lifting and lowering of the template. The sleeve guide members are adapted to receive and guide the piles when being driven into the substrate, and preferably comprise cylindrical members, the longitudinal axis thereof extending parallel to the out-of-plane direction of the template. The sleeve guide members are arranged according to a geometric pattern that reflects the desired geometric pattern of the foundation piles. The tubular frame members extending between the sleeve guide members ensure that the sleeve guide members substantially remain in their desired position. In this embodiment, the template is adapted to accommodate a particular geometric pattern of the foundation piles. It is also possible however to make the template geometry adjustable, for instance by providing the template with frame members that are adjustable in length, or by providing the template with nodes that connect frame members and allow to change the angle between the frame members. Such an embodiment allows accommodating different geometric patterns of the foundation piles.

In a preferred embodiment of the method according to the invention, the method comprises locating the position for at least one pile and positioning the assembly of platform and template such that at least one sleeve guide member of the template is above said pile position. Driving a first pile through the at least one sleeve guide member with the template in the operative position fixates the template. In such a position, the sleeve guide members for the other piles will automatically be in their correct positions, due to the fact that their mutual positions are determined by the geometrical layout of the template. This eliminates the need for pile to pile measurements. In yet another preferred embodiment of the method of the invention, the platform is provided with at least one moonpool, adapted to receive a pile, and the assembly of platform and template is positioned such that the moonpool is above said pile position and aligned with one of the sleeve guide members. In such an embodiment, the framed template is at least partly moved over and/or under the jack-up platform thereby covering a substantial part of the platform. Driving a first pile through the moonpool and through said sleeve guide member with the template in the operative position fixates the template with respect to the platform.

Even more preferred is a method, wherein the platform is provided with at least two moonpools, adapted to receive a pile, and the assembly of platform and template is positioned such that the at least two moonpools are above at least two pile positions and aligned with at least two of the sleeve guide members. This embodiment saves even more space, as well as an improved fixation of the template with respect to the platform (and substrate).

Another preferred embodiment of the method according to the invention is characterized in that the framed template is provided to the underside of the platform in its in-operative position, i.e. in its position at rest. Bringing the template from its inoperative position to its operative position (and vice versa) is in this embodiment readily achieved.

The sleeve guide members of the framed template are adapted for receiving and guiding the piles when driving them into the substrate. To be able to receive the piles, the sleeve guide members preferably have a cross-section that is at least the size of the cross-section of the piles. To adequately support the piles, a preferred embodiment of the method makes use of sleeve guide members of which the inner surface is over part of the length of the sleeve guide members provided with supporting ribs for the piles. In order to be able to remove the template easily after the piles have been installed into their final position, the piles are preferably driven into the substrate through the sleeve guide members until the top surface of the piles extends further than said (ribbed) part of the length of the sleeve guide members.

The method according to the invention is preferably characterized in that the piles are driven into the substrate by a pneumatic hammer, provided on the platform. Even more preferred is a method wherein the piles are driven with into the substrate with their top surface further than said (ribbed) part by the follower of a pneumatic hammer. A pneumatic hammer with follower is known per se to the skilled person.

In another aspect of the invention, a method is provided which includes removing the template once the piles have been installed. It is preferred to provide a method wherein removing the template is carried out by lifting it along the spud poles from the operative position towards the in-operative position close to the deck of the platform.

The invention further relates to a method for installing an elevated mass, such as the jacket of a wind mill or a jetty, onto a foundation comprising a plurality of piles that have been driven into a substrate by a method as described above, the method comprising inserting legs of the elevated mass into the piles. Even more preferred is a method, comprising grouting said legs of the elevated mass to the top of the piles.

Although the method according to the invention may be applied to provide a foundation of the type as described above, the method is preferably applied to a substrate that is under water.

In another aspect of the invention, an assembly of a jack-up platform and a framed template, adapted for providing a foundation for an elevated mass, such as the jacket of a wind mill or a jetty, the foundation comprising a plurality of piles, driven into a substrate according to a geometric pattern, is provided, the template having a plurality of interconnected sleeve guide members for receiving the piles, arranged according to the geometric pattern, and means for slidably moving it along the spud poles of the platform. The advantages of such an assembly have already been elucidated in the context of describing the method above, and will not be repeated here.

In another preferred embodiment of the invention, an assembly is provided wherein the platform comprises at least one moonpool, adapted to receive a pile, and aligned with one of the sleeve guide members. In order to be able to receive a pile, the at least one moonpool should have a cross-sectional dimension that is sufficiently large to accommodate a pile. The method according to the invention is particularly suitable for cylindrical hollow piles having an outer diameter of at least 1.2 m, more preferably at least 1.5 m and most preferably at least 1.8 m, and a wall thickness ranging from 0.01 to 0.1 m, more preferably from 0.02 to 0.08 m, and most preferably from 0.04 to 0.06 m. A particularly preferred assembly according to the invention comprises an at least one moonpool that is circular and has a diameter of at least 1.5 m, more preferably of at least 2.5 m and most preferably of at least 3 m.

The method according to the invention is further in particular suitable for cylindrical hollow piles having a length of at least 20 m, more preferably at least 25 m and most preferably at least 30 m, and a weight ranging from 20 to 150 tons, more preferably from 40 to 130 tons, and most preferably from 50 to 110 tons. Another particularly preferred assembly according to the invention comprises sleeve guide members, the height (the dimension in the length direction of the sleeve guide member) of which is at least 1 m, more preferably at least 3 m, and most preferably at least 5 m.

In still another aspect of the invention, a framed template is provided, the template being adapted to provide a foundation for an elevated mass, such as the jacket of a wind mill or a jetty, whereby the foundation comprises a plurality of piles, driven into a substrate according to a geometric pattern, the template comprising a plurality of interconnected sleeve guide members for receiving piles to be driven into the substrate, the sleeve guide members being arranged according to the geometric pattern, and means for slidably moving the framed template along the spud poles of a platform.

SUMMARY OF THE INVENTION

Figure 2:
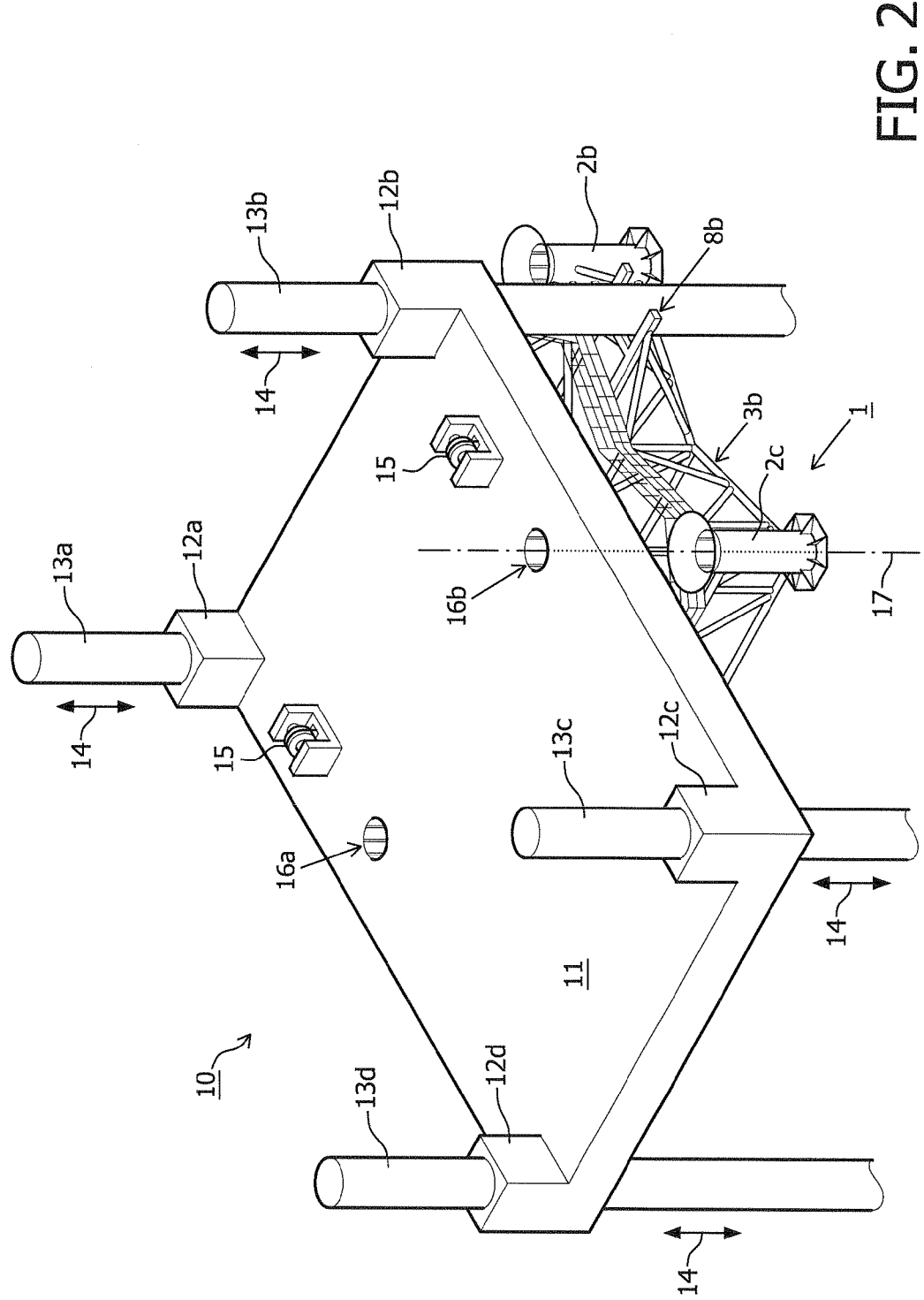
Figure 8:
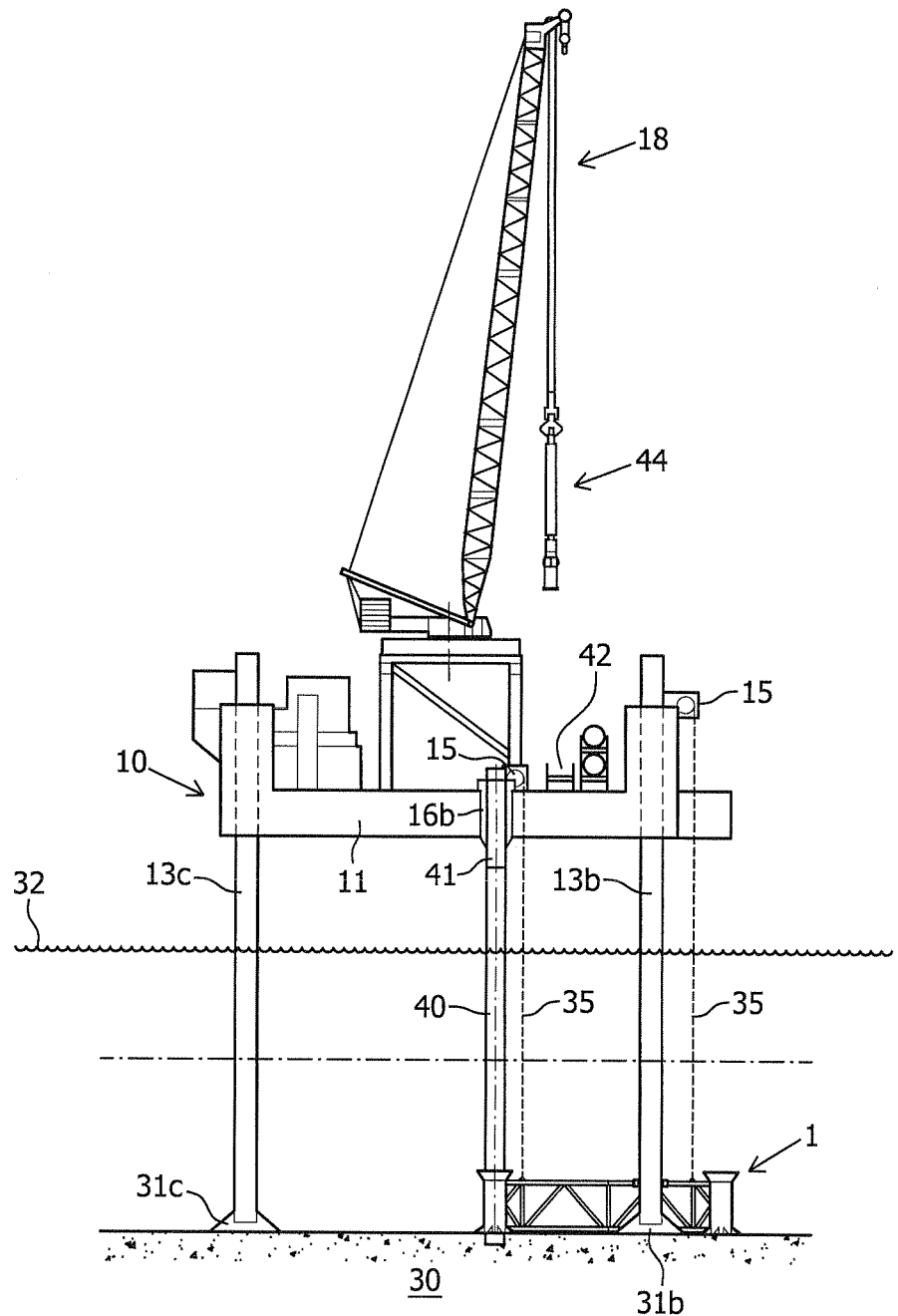
Figure 9:
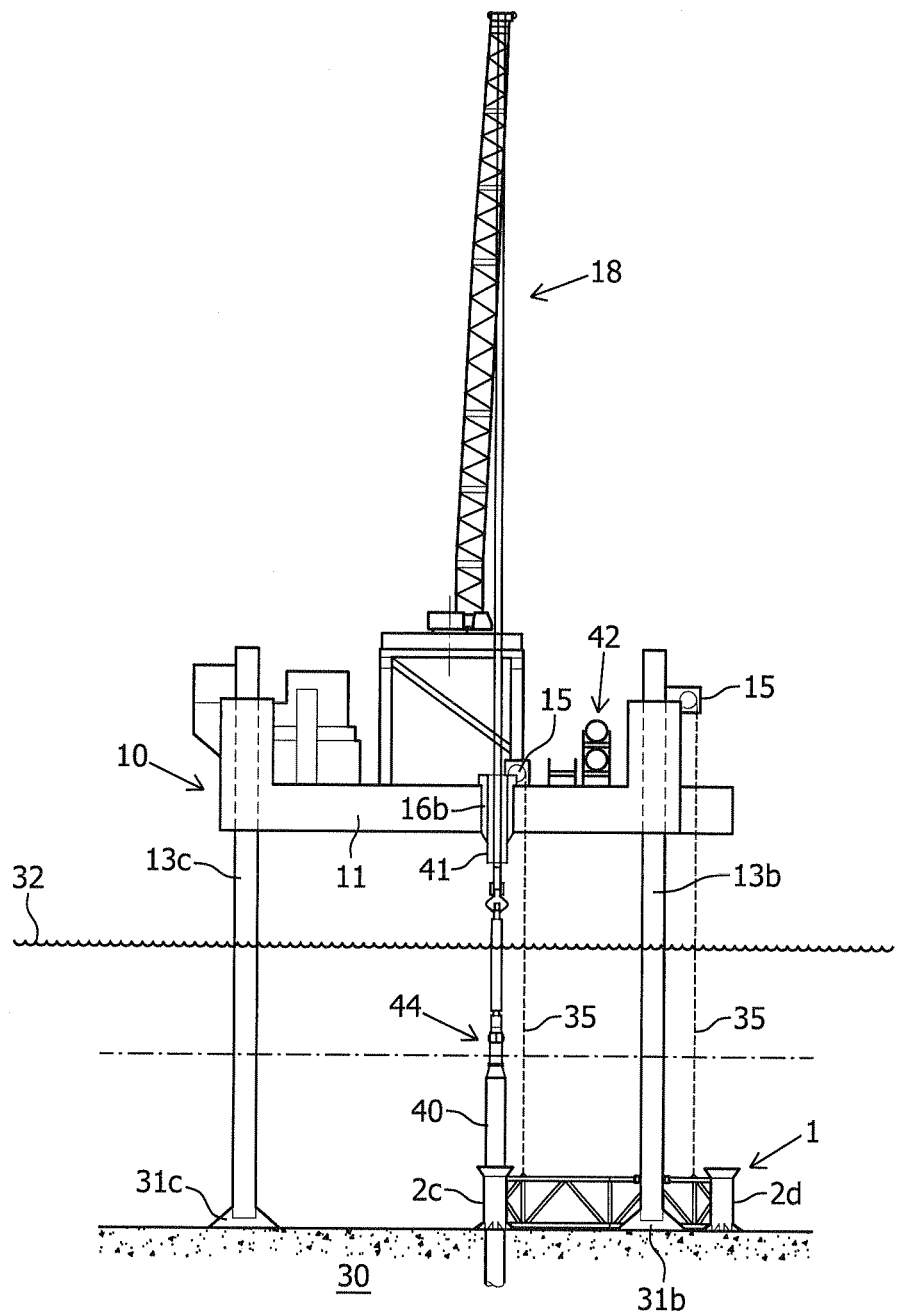
Figure 10:
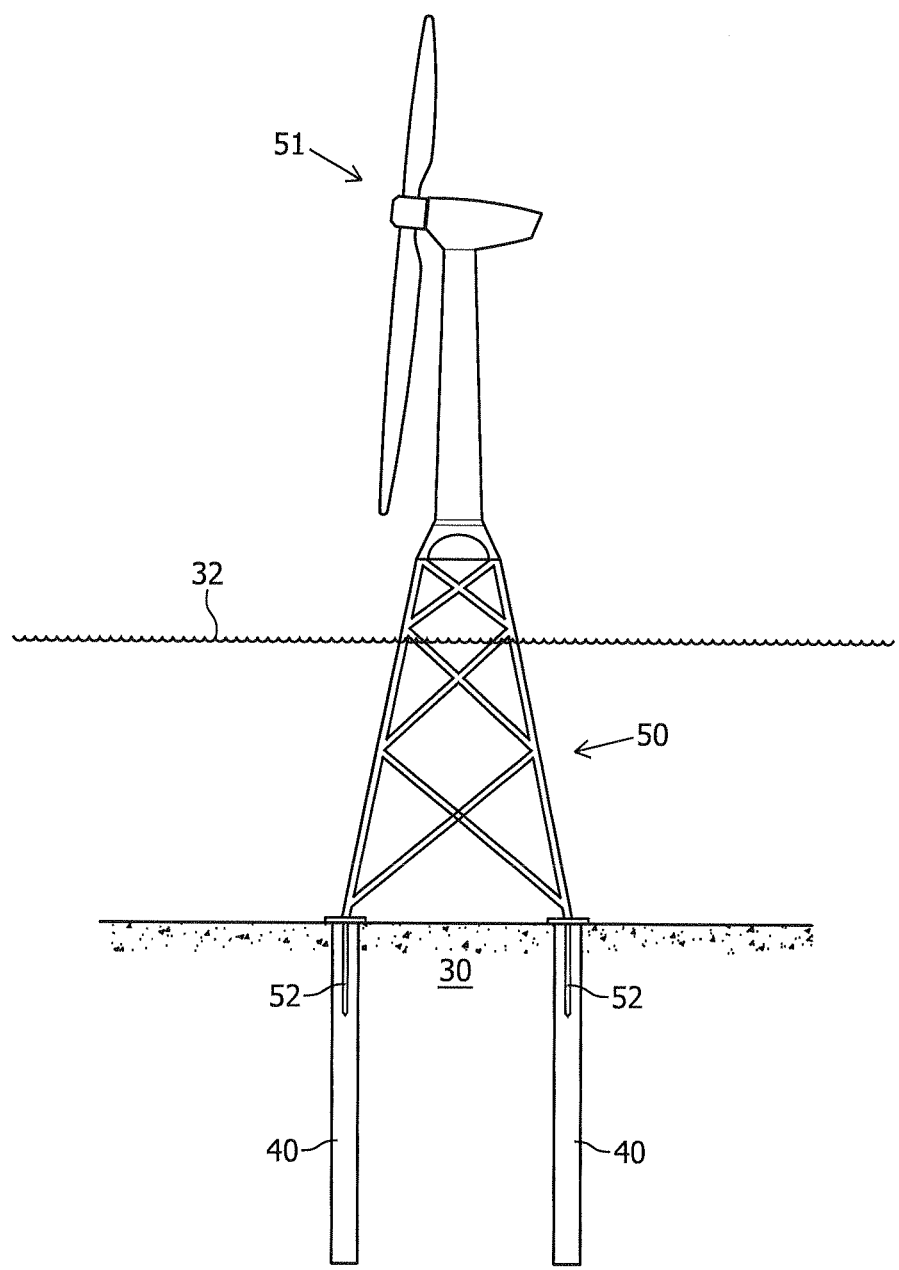

The invention will now be explained in more detail with reference to the drawings, without however being limited thereto and wherein:

FIG. 1 schematically shows a perspective view of an embodiment of the framed template as used in the method according to the invention;

FIG. 2 schematically shows a perspective view of an embodiment of the jack-up platform adapted to be used in the method according to the invention;

FIGS. 3-9 schematically show side views of the assembly of platform and template in a number of positions, according to several steps of the method according to the invention; and FIG. 10 schematically shows a jacket of a wind mill placed onto a foundation comprising a plurality of piles, driven into an underwater bottom by a method according to the invention.

DETAILED DESCRIPTION

Referring to FIG. 1, a framed template 1 is shown, the template 1 comprising four cylindrical guide members (2a, 2b, 2c, 2d) that form a sleeve adapted to receive and guide a pile. The sleeve guide members (2a, 2b, 2c, 2d) are interconnected by side frames (3a, 3b, 3c, 3d) that are build up by a plurality of tubular structural members (4a, 4b, 4c, 4d). Cross-members (5a, 5b, 5c, 5d) connect the side frames (3a, 3b, 3c, 3d) to a central nodal plate 6 to give the trussed structure sufficient structural stiffness. Additional frames, such as frame 3e may be added to increase stiffness. All members (2, 3, 4, 5) and nodal plate 6 together define the template 1. The upper parts of the side frames (3a, 3b, 3c, 3d) are conveniently provided with a circumferential walking bridge 9 for easy access and inspection. The guide members (2a, 2b, 2c, 2d) are held in a fixed position with respect to each other by the side frames (3a, 3b, 3c, 3d) and the structural members (5a, 5b, 5c, 5d), and such that the guide members (2a, 2b, 2c, 2d) are arranged according to a geometric pattern, which, in the embodiment shown in FIG. 1 is a square with a side of about 20 m. Any other geometric pattern is equally possible. Each sleeve guide member (2a, 2b, 2c, 2d) has a cylindrical guiding body (23a, 23b, 23c, 23d) that is supported by a base plate (21a, 21b, 21c, 21d), by which the template 1 can take support onto a substrate. The inner surface of each sleeve guide member (2a, 2b, 2c, 2d) is over part of the length of the sleeve guide member provided with supporting ribs (22a, 22b, 22c, 22d) aimed at supporting a pile when translating through the sleeve guide member. Guide members (2a, 2b, 2c, 2d) may vary widely in dimensions, but in the embodiment shown have a height of about 6 m. The supporting ribs (22a, 22b, 22c, 22d) extend over a distance of about 3 m, as measured from the upper surface of the guide members (2a, 2b, 2c, 2d), which leaves the lower end of the inner surface of about 3 m without supporting ribs (22a, 22b, 22c, 22d) (and thus a larger diameter).

The template 1 is further provided with means for slidably moving the template 1 along the spud poles of the jack-up platform, shown in FIG. 2 and described in more detail further below. The sliding means in the embodiment shown in FIG. 1 are two H-shaped structures (8a, 8b), that are provided at the ends defined by side frames 3d and 3b respectively. The H-shaped structures (8a, 8b) are rigidly connected to the rest of the template structure by additional tubular members. The template 1 is positioned relative to the platform 10 in such a manner that a spud pole (13a, 13b, 13c, 13d) of the platform 10 is received in the space between the outermost legs of the H-shaped structures (8a, 8b). This space is large enough to accommodate a spud pole. In this way the template 1 can be slid downwards and/or lifted along the spud pole(s). The means for slidably moving the template 1 along the spud poles (13a, 13b, 13c, 13d) of the platform 10 also comprise hoisting means such as winches 15, provided on the platform 10.

Figure 3:
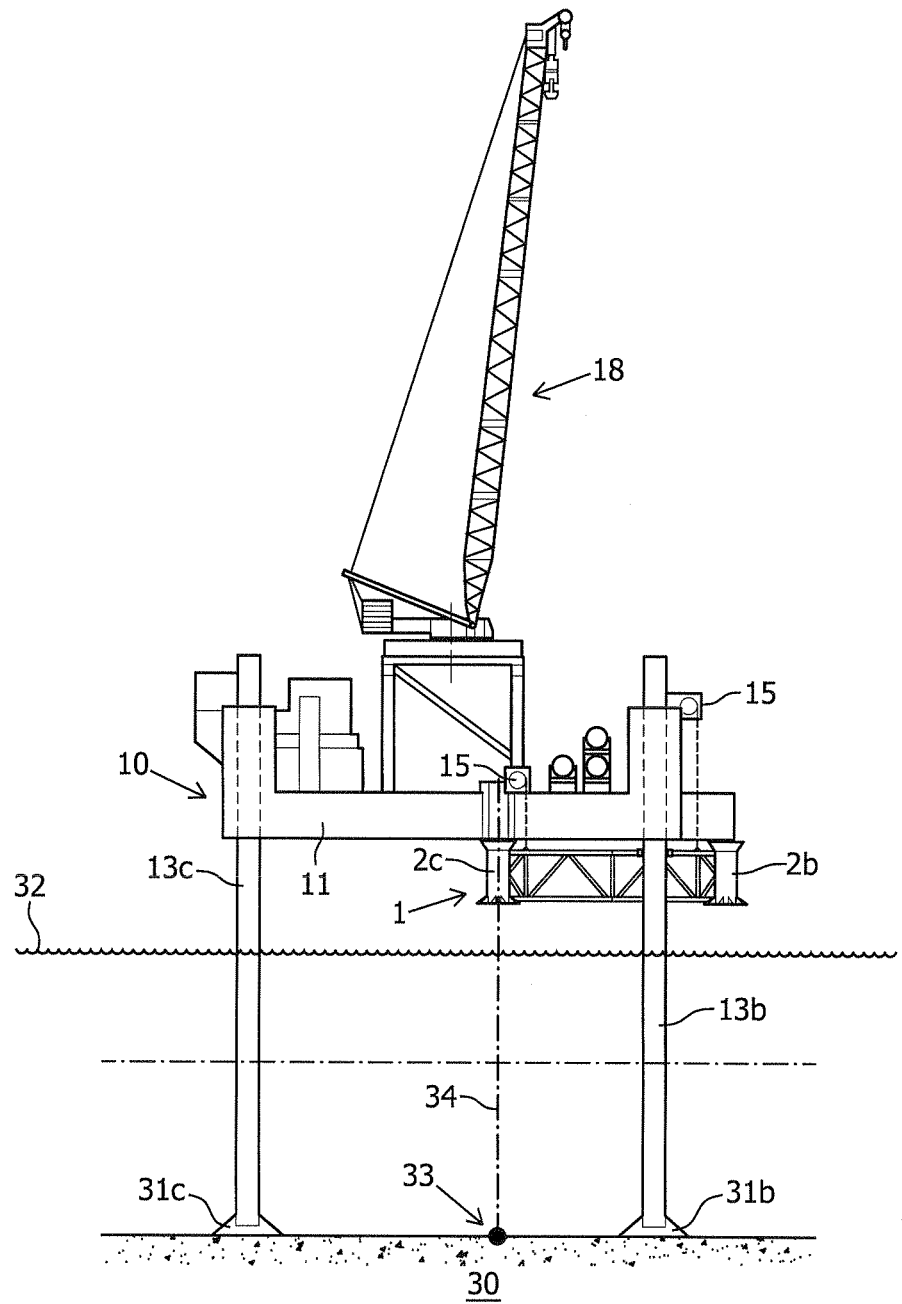

A jack-up platform 10, adapted according to the invention is shown in FIG. 2. For reasons of clarity, many devices that are usually included with a jack-up platform, such as a lifting crane 18 (see FIGS. 3-9) have been left out of the figure. Jack-up platform 10 essentially comprises a working deck 11 and four spud pole winches (12a, 12b, 12c, 12d) on the corners of working deck 11. Winches (12a, 12b, 12c, 12d) each comprise a spud pole (13a, 13b, 13c, 13d) that can be lowered in the vertical direction 14 until it takes support onto a substrate, such as an underwater bottom 30 (FIG. 3). On the working deck 11 are provided winches 15 with cables that may be attached to the template 1 and are adapted to hoist and/or lower template 1 in the vertical direct ion 14. The jack-up platform 10 is further provided with two circular moonpools (16a, 16b) that give access to the water below the working deck 11 and have a diameter large enough to accommodate a pile. The jack-up platform 10 carries the framed template 1 which in the preferred embodiment shown is provided to the underside of the jack-up platform 10 in its inoperative position, i.e. a position at rest in which template 1 is vertically close to the working deck 11 of jack-up platform 10. The assembly of jack-up platform 10 and template 1 is positioned such that the moonpool 16a is vertically aligned with sleeve guide member 2d, whereas moonpool 16b is vertically aligned with sleeve guide member 2c, as shown in FIG. 2 by virtual line 17.

One embodiment of the method according to the invention is shown in a number of steps in FIGS. 3 to 9.

Referring to FIG. 3, the step is shown of locating the desired position 33 for a first pile to be driven into the underwater bottom 30 and positioning the assembly of jack-up platform 10 and template 1 such that one sleeve guide (in the embodiment shown this is sleeve guide 2c) of the template 1 is vertically aligned above said pile position 33, as schematically shown by virtual line 34. The spud poles (13a, 13b, 13c, 13d) of jack-up platform 10 in the fixed position take support onto the underwater bottom 30 by means of removable shoes (31a, 31b, 31c, 31d). Template 1 is held in position by winches 15 that operate hoisting cables 35. In the inoperative (docking) position of template 1, the exposed length of the hoisting cables 35 is relatively short.

Figure 4:
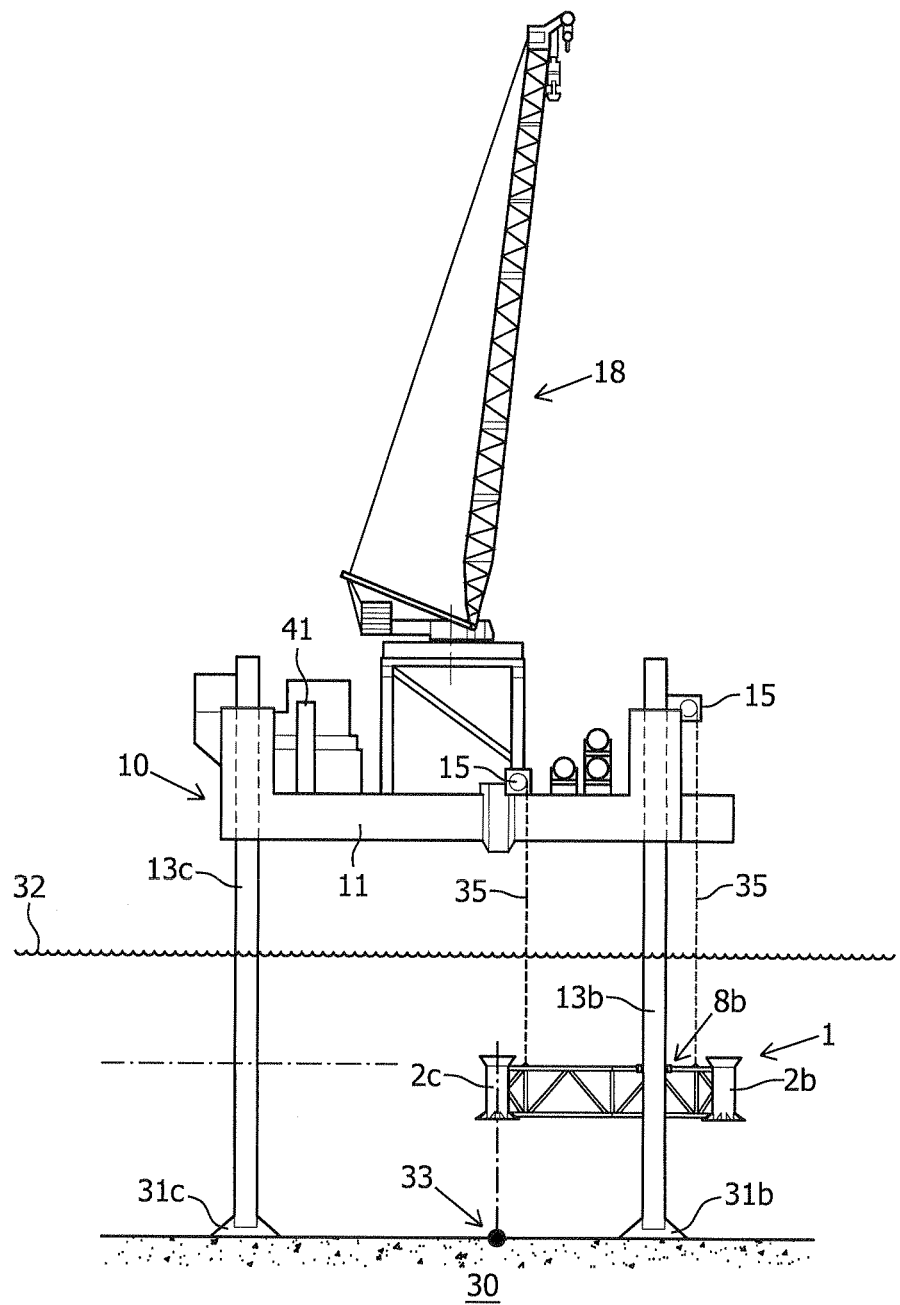
Figure 5:
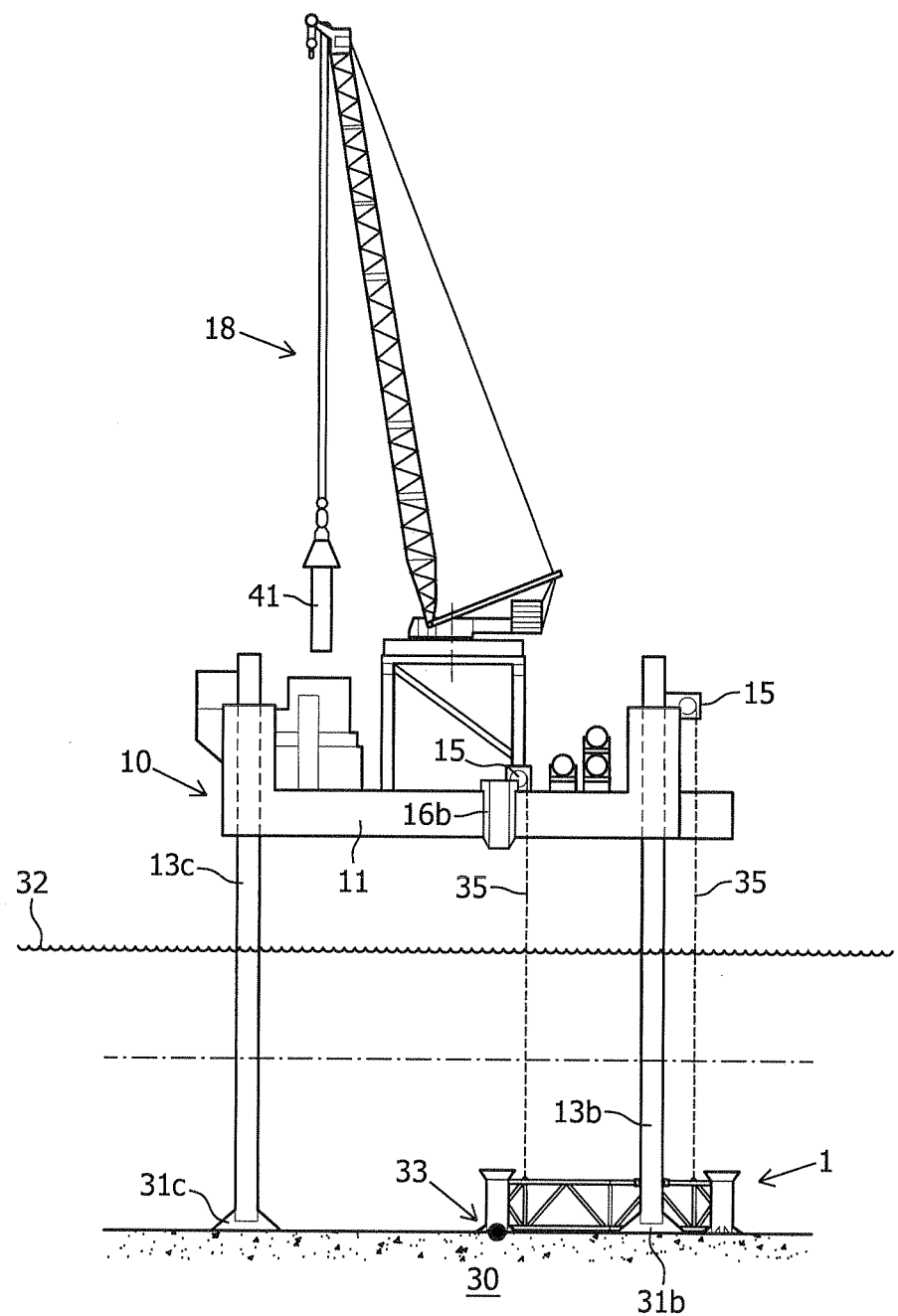

As shown in FIG. 4, the template 1 is then lowered by winches 15 to under the water level 32 towards its operative position, in which template 1 preferably at least partly rests onto the underwater bottom 30, as is shown in FIG. 5. When lowering template 10, it slides with the H-shaped structures (8a, 8b) along the spud poles (13a, 13b) so that its position relative to jack-up platform 1 is not substantially changed (apart from its vertical position). The winches 15 operate independently from each other and are controlled such that the template 1 is positioned substantially horizontal (or substantially perpendicular to the spud poles). This ensures that piles are driven into the underwater bottom 30 in a substantially vertical direction, irrespective of the height profile of the bottom 30.

A pile casing 41 is then picked up by lifting crane 18 and placed into the moonpool 16b above the desired position 33 of the first pile, as shown in FIG. 5.

Figure 6:
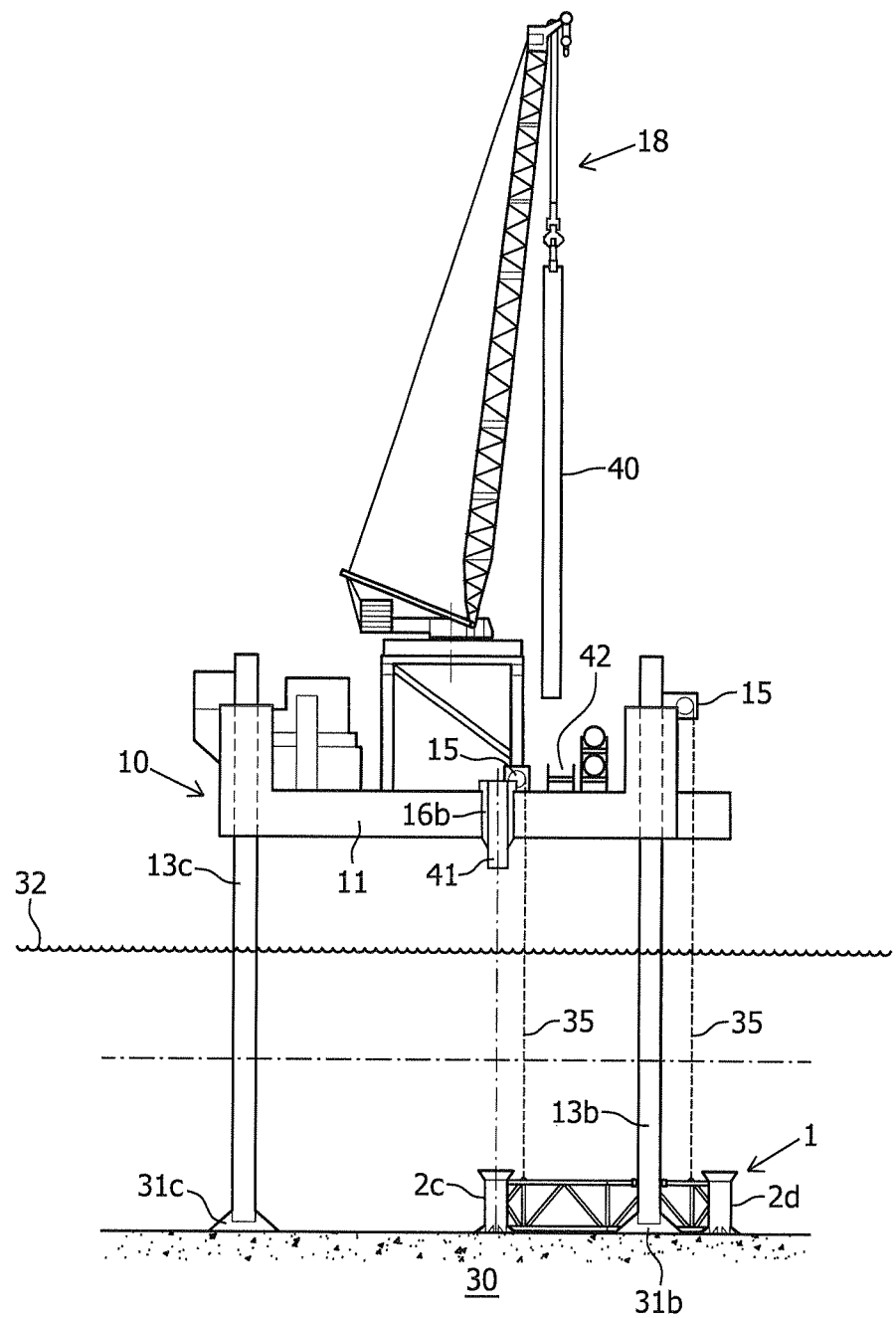
Figure 7:
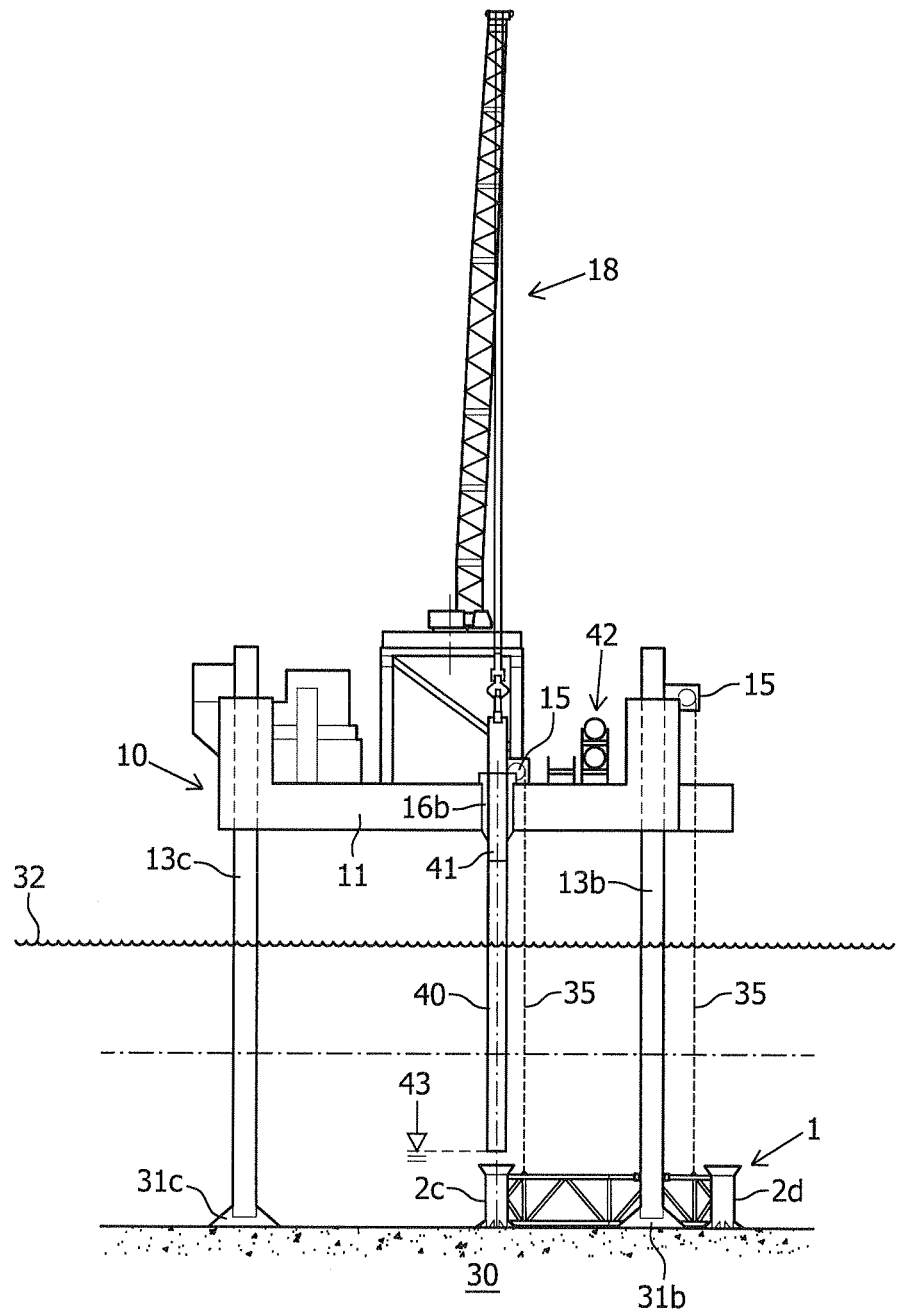

In a next step of the method, as shown in FIG. 6, a pile 40 is picked up by lifting crane 18 from its storage rack 42 and lifted in casing 41, provided in moonpool 16b until its underside is at a level 43, which is close to the level of the underwater bottom, as shown in FIG. 7.

When the pile 40 is correctly aligned with sleeve guide member 2c, the pile 40 is further lowered until it is received by sleeve guide member 2c. The pile 40 is then driven into the underwater bottom 30 under its own weight in which process the pile 40 is guided by sleeve guide member 2c, as shown in FIG. 8. If the length of the pile 40 is such that it exceeds the difference in height between the working deck 11 and the underwater bottom 30, the jack-up platform 1 may be lowered by operating the spud pole winches (12a, 12b, 12c, 12d) such that the working deck 11 moves downwards with respect to the spud poles (13a, 13b, 13c, 13d) that remain supported by the underwater bottom 30. In another step of the method, as shown in FIG. 9, the pile 40 is then driven into the underwater bottom 30 through sleeve guide member 2c until the top surface of the pile 40 extends further the ribbed part of the length of sleeve guide member 2c. Driving the pile 40 into the substrate is conveniently performed under the action of a pneumatic hammer 44, known per se in the art. The pile 40 is driven further than the ribbed part of the inner surface of sleeve member 2c by the follower of the pneumatic hammer 44. In this way the upper surface of the pile 40 reaches a level which is below the ribbed part. At this level the inner diameter of sleeve member 2c is larger than the outer diameter of pile 40, which therefore is no longer supported by sleeve member 2c. This allows to readily free the template 10 from the driven in pile 40 if desired.

The above described sequence is repeated for all piles that need to be driven in the underwater bottom 30. Since the sleeve guide members (2a, 2b, 2c, 2d) of framed template 10 are automatically at the correct positions, all piles 40 are efficiently driven into the underwater bottom 30 without having to loose time in determining exact positions and the like.

After all piles 40 have been driven into the underwater bottom 30 in the manner described above, the template 1 is removed by lifting it with the aid of winches 15 and hoisting cables 35 while being guided by H-shaped structures (8a, 8b) along the spud poles (13a, 13b) from the operative position towards the in-operative position close to the deck 11 of jack-up platform 10. Before removing the template 1, the position of the piles 40 and/or the vertical position of the top of each of the piles 40 may optionally be determined, preferably by acoustic transponder means (not shown). It is also preferred to equip template 1 with a plurality of optical measuring devices, such as cameras in order to monitor and control the whole operation.

As schematically shown in FIG. 10, a jacket 50 of a wind mill 51 is then placed onto the foundation of piles 40 that have been installed into the underwater bottom 30 according to a geometric pattern by the method as described above. This is conveniently done by inserting legs 52 of jacket 50 into the piles 40, and then grouting the inserting legs 52 to the top of the piles 40. The method and assembly of a platform and template according to the invention allow the provision of a piling foundation in an efficient manner, obviating the need for repositioning the platform, and requiring less time than the known method. The method is less dependent on weather conditions and moreover does not need extensive monitoring operations under water, for instance by robots and/or diving personnel.

The invention claimed is:

1. Method of providing a foundation for an elevated mass, whereby the foundation comprises a plurality of piles, driven into a substrate according to a geometric pattern, the method comprising the sequential steps of:

providing an assembly of a jack-up platform having spud poles and a framed template, the template having a plurality of interconnected sleeve guide members for receiving the piles, arranged according to the geometric pattern, and means for slidably moving the template along the spud poles of the platform, which means comprise a plurality of tension cables that are at one end attached to the template and at another end to winches, provided on the jack-up platform, as well as slidable connections to the spud poles of the platform that are distinct from the sleeve guide members;

locating a pile position for at least one pile of the foundation in view of an envisaged position of the plurality of piles;

positioning the assembly in a correct position determined by the envisaged position of the plurality of piles by positioning the assembly such that at least one sleeve guide of the template is above and aligned with said pile position;

lowering the framed template by varying the length of the tension cables such that the slidable connections slide along the spud poles from an in-operative position close to the deck of the platform towards the substrate to an operative position whereby, apart from its vertical position, the position of the template relative to the platform does not substantially change during the lowering of the template such that the template is automatically positioned correctly in the operative position when the platform is in said correct position, driving a first pile through the at least one sleeve guide with the template in the operative position to fixate the template;

driving the piles into the substrate through the sleeve guide members of the template in its operative position; and removing the template once the piles have been installed, whereby removing the template is carried out by lifting it along the spud poles from the operative position towards its in-operative position close to the deck of the platform.

2. Method according to claim 1, wherein the means for slidably moving the template along the spud poles of the platform are adapted to level the template such that it is substantially horizontal in its operative position.

3. Method according to claim 1, wherein the platform is provided with at least one moonpool, adapted to receive a pile, and the assembly of platform and template is positioned such that the moonpool is above said pile position and aligned with one of the sleeve guide members.

4. Method according to claim 1, wherein the framed template is provided to the underside of the platform in its in-operative position.

5. Method according to claim 1, wherein the inner surface of the sleeve guide members is over part of the length of the sleeve guide members provided with supporting ribs for the piles, and the piles are driven into the substrate through the sleeve guide members until the top surface of the piles extends further than said part of the length of the sleeve guide members.

6. Method according to claim 5, wherein the piles are driven further than said part by the follower of a pneumatic hammer.

7. Method for installing an elevated mass, onto a foundation comprising a plurality of piles, driven into a substrate by a method according to claim 1, the method comprising inserting legs of the elevated mass into the piles.

8. Method according to claim 1, in which the substrate is under water.

9. An assembly of a jack-up platform having spud poles and a framed template, adapted for providing a foundation for an elevated mass, whereby the foundation comprises a plurality of piles, driven into a substrate according to a geometric pattern, the template having a plurality of interconnected sleeve guide members for receiving the piles, arranged according to the geometric pattern, and means for slidably moving the template along the spud poles of the platform, which means comprise a plurality of tension cables that are at one end attached to the template and at another end to winches, provided on the jack-up platform, as well as slidable connections to the spud poles of the platform, and the jack-up platform is provided with positioning means for positioning the platform in a correct position in view of the envisaged position of the plurality of piles and with means for lowering the framed template along the spud poles from an in-operative position close to the deck of the platform towards the substrate to an operative position, whereby, apart from its vertical position, the position of the template relative to the platform does not substantially change during the lowering of the template such that the template is automatically positioned correctly in the operative position when the platform is in said correct position.

10. Assembly according to claim 9, wherein the sliding means comprise two H-shaped structures that are rigidly connected to the rest of the template structure and the template is positioned relative to the platform such that a spud pole of the platform is received in the space between outermost legs of the H-shaped structures.

11. Assembly according to claim 10, wherein the means for slidably moving the template along the spud poles of the platform comprise hoisting means, provided on the platform.

12. Assembly according to claim 11, wherein the platform is provided with at least one moonpool, adapted to receive a pile, and aligned with one of the sleeve guide members.

13. Assembly according to claim 12, wherein the at least one moonpool is circular and has a diameter of at least 1.5 m, more preferably at least 2.5 m and most preferably at least 3 m.

14. Assembly according to claim 13, wherein the height of the sleeve guide members is at least 1 m, more preferably at least 3 m, and most preferably at least 5 m.

15. Framed template, adapted to provide a foundation for an elevated mass, whereby the foundation comprises a plurality of piles, driven into a substrate according to a geometric pattern, the template comprising a plurality of interconnected sleeve guide members for receiving piles to be driven into the substrate, the sleeve guide members being arranged according to the geometric pattern, and means for slidably moving the framed template along the spud poles of a platform, whereby, apart from its vertical position, the position of the template relative to the platform does not substantially change during the lowering of the template, which means comprise a plurality of tension cables that are at one end attached to the template and at another end may be attached to winches, provided on the platform, as well as slidable connections to the spud poles of the platform that are distinct from the sleeve guide members.

16. Framed template according to claim 15, wherein the sliding means comprise two H-shaped structures that are rigidly connected to the rest of the template structure and are adapted to receive a spud pole of the platform in the space between outermost legs of the H-shaped structures.

\* \* \* \* \*